(12) United States Patent
Khalona

(10) Patent No.: US 6,240,081 B1
(45) Date of Patent: May 29, 2001

(54) MULTICODE CDMA TRANSMITTER WITH IMPROVED SIGNAL PROCESSING

(75) Inventor: Ramon A. Khalona, Carlsbad, CA (US)

(73) Assignee: Denso Corporation, Aichi-ken (JP)

( * ) Notice: Subject to any disclaimer, the term of this patent is extended or adjusted under 35 U.S.C. 154(b) by 0 days.

(21) Appl. No.: 09/007,509

(22) Filed: Jan. 15, 1998

(51) Int. Cl.$^7$ .............................. H04B 7/216; H04B 1/707
(52) U.S. Cl. ........................ 370/342; 370/335; 370/206; 375/130; 375/142; 375/150
(58) Field of Search ..................... 370/335, 342, 370/206, 209, 479; 375/140–150, 261, 271, 272, 279, 280, 281, 298, 308, 301, 130, 137, 135, 136; 323/103, 104; 455/102, 103, 104

(56) References Cited

U.S. PATENT DOCUMENTS

| 5,414,728 | * | 5/1995 | Zehavi | 370/342 |
| 5,638,401 | * | 6/1997 | Jones | 375/298 |
| 5,729,570 | * | 3/1998 | Magill | 375/308 |
| 5,818,867 | * | 8/1998 | Rasmussen | 332/103 |
| 5,861,781 | * | 1/1999 | Ashby | 375/301 |
| 5,930,299 | * | 7/1999 | Vannatta | 375/308 |
| 5,956,328 | * | 9/1999 | Sato | 370/335 |
| 5,982,807 | * | 11/1999 | Snell | 370/342 |
| 6,044,103 | * | 3/2000 | Weaver | 375/298 |

* cited by examiner

Primary Examiner—Wellington Chin
Assistant Examiner—Steven Nguyen
(74) Attorney, Agent, or Firm—Fish & Richardson P.C.

(57) ABSTRACT

CDMA communication over multiple channels by phase shifting at baseband and then RF modulating without a phase shift. Total number of baseband filters is reduced by summing channel components prior to baseband filtering.

9 Claims, 5 Drawing Sheets

MULTICODE CDMA TRANSMITTER WITH IMPROVED SIGNAL PROCESSING

FIELD OF THE INVENTION

The present invention describes a multicode CDMA transmitter simplified hardware and signal processing.

BACKGROUND

The IS-95 standard describes a communication protocol to be carried out using code division multiple access ("CDMA") processing. Wireless communications standards, such as the IS-95 communications standard, will allow transmission at up to 64 kilobits per second ("KB/s") on forward and reverse links. This data transmission uses multiple code channels. Each code channel carries a specified data rate. The proposed system is shown in FIG. 1.

The ratio between the peak value and the average value of the transmitted signal in such a system should be kept as small as possible in order to minimize the peak power output of the transmitter chain. However, all of the multiple code channels 100, 130, 132 convey information which may be correlated to some extent. The information in those code channels are eventually added together by adder 125 to form a composite signal 120. That signal would have a high peak to average power ratio in the transmitted signal.

The IS-95 standard suggests minimizing this problem by independently phase shifting with respect to the fundamental channel each of the supplemental codes channels $S_i(t)$ to $S_n(t)$. These phase shifts are fixed by the IS-95 standard as follows:

TABLE I

PHASE SHIFT ANGLES FOR
SUPPLEMENTAL CODE CHANNELS

| Supplemental Code Channel I | Carrier phase offset $\phi$, (radian) |
|---|---|
| 1 | $\pi/2$ |
| 2 | $\pi/4$ |
| 3 | $3\pi/4$ |
| 4 | 0 |
| 5 | $\pi/2$ |
| 6 | $\pi/4$ |
| 7 | $3\pi/4$ |

This modification attempts to minimize the peak to average ratio. However, it does so at the expense of significant hardware/signal processing requirements.

A fundamental code channel 100 is combined with a plurality of supplemental code channels. Two supplemental code channels 130, 132 are shown. The total number of supplemental code channels can actually vary between n=1 and 7. The fundamental channel is used to transmit voice while the supplemental channels transmit coded information i.e., (data). Channel 100 transmits its data "in phase" and "quadrature" modulated according to the component cosine or sin of $2\pi f_c t$. Each of the code channels are formed independently using distinct I and Q code sequences which are respectively modulated according to the cos and sin.

The I and Q code sequences are baseband-filtered by respective filters 102, 104. The baseband filters are offset-quadrature phase shift keying ("O-QPSK") modulators. These modulators operate as known in the art. The thus-modulated signals are then added to form a composite signal 106; also called $s_n(t)$, where n is the channel number. All of the composite signals from the various phase-shifted channels are finally added by an adder 125, to form a final composite signal 120. The mobile unit transmits that composite signal. The circuit shown in FIG. 1 requires two of the baseband filters 102, 104 for each of the channels. This circuit requires 2·(n+1) baseband filters for the n+1 channels.

Moreover, this proposed circuit applies its phase shift as part of the modulation by the fundamental frequency, hence in the RF domain.

The inventor of the present invention realized that operations in the baseband domain can be carried out much more easily than operations at RF. For example, an integrated circuit which is optimized for arithmetic operations is often used in forming the coded signal. Most of the calculations at baseband can be done on such a device, e.g. a digital signal processor ("DSP") or other specialized processing device.

On the other hand, operations carried out at RF frequencies cannot be done this way. Such operations require specialized RF techniques including balancing lines and other known features.

SUMMARY

The inventor of the present invention, recognizing these drawbacks, has made certain recognitions about the overall circuit. These recognitions allow certain advantages, including implementation of the phase shift operation for each supplemental channel prior to RF modulation. This enables the operation to be done on an existing specialized processing device, e.g., a digital signal processor (DSP), hence allowing such operations to be done using the existing hardware.

In addition, the inventor recognized that use of linear baseband filtering enables a circuit which reduces the total number of baseband filters.

These and other operations will be described with reference to the following.

BRIEF DESCRIPTION OF THE DRAWINGS

These and other aspects will now be described in detail with reference to the accompanying drawings, wherein.

DESCRIPTION OF THE PREFERRED EMBODIMENTS

A first embodiment performs the phase shifting operation at baseband instead of RF. The baseband operations can be carried out on a special purpose calculation device, e.g., a digital signal processor.

The inventor noted that the i-th signal (where i is between 0 and n=7 channels max) to the input of the final adder 120 can be mathematically expressed as follows:

$$s_i(t) = I'_i \cos(\omega_c t + \phi_i) + Q'_i \sin(\omega_c t + \phi_i) \quad i0 \leq i \leq 7$$

$$= I'_i [\cos \omega_c t \cos \phi_i - \sin \omega_c t \sin \phi_i] + Q'_i [\sin \omega_c t \cos \phi_i + \cos \omega_c t \sin \phi_i]$$

$$= \cos \omega_c t [I'_i \cos \phi_i + Q'_i \sin \phi_i] + \sin \omega_c t [Q'_i \cos \phi_i - I'_i \sin \phi_i](I)$$

Figure 1:
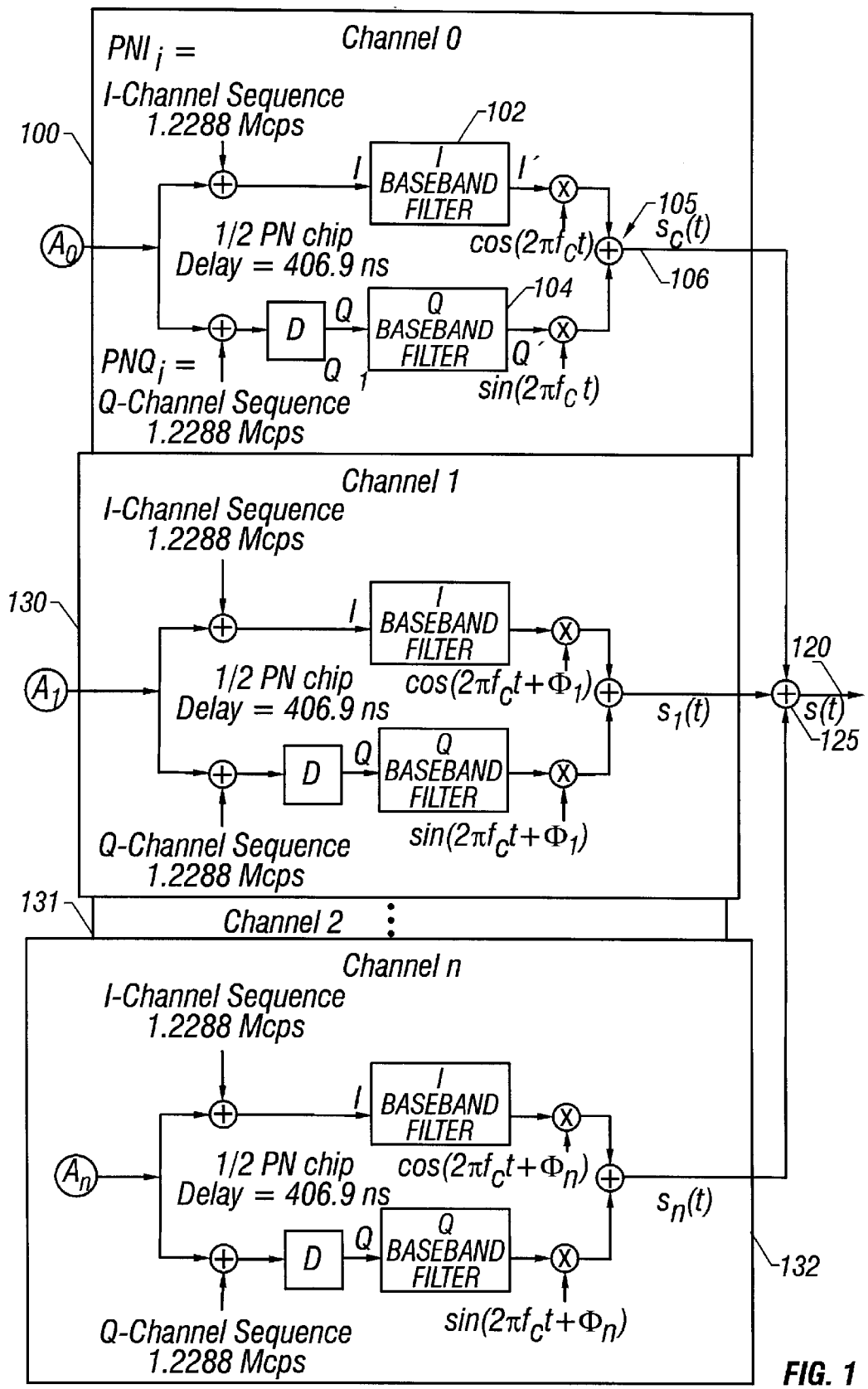
FIG. 1 shows a reverse channel structure device.

The first part of this equation represents the specific operation of FIG. 1. For each channel, the phase shifting is carried out at RF by multiplying the baseband signal by the cosine and sine respectively of the fundamental ($\omega_c t+\phi_i$). The first part of the equation simply represents the operations carried out by the prior art circuit of FIG. 1.

The second two portions of the equation show an equivalent mathematical representation of the signal to remove the phase shifting at Rf due to the fact that the angles $\phi_i$ as shown in Table 1 are constant. The final part of equation 1 requires multiplication only by cos $\omega_c$t sin $\omega_c$t without any phase shift being added in the RF domain. Instead the phase-shift is equivalently added via multiplication in the baseband domain.

Figure 2:
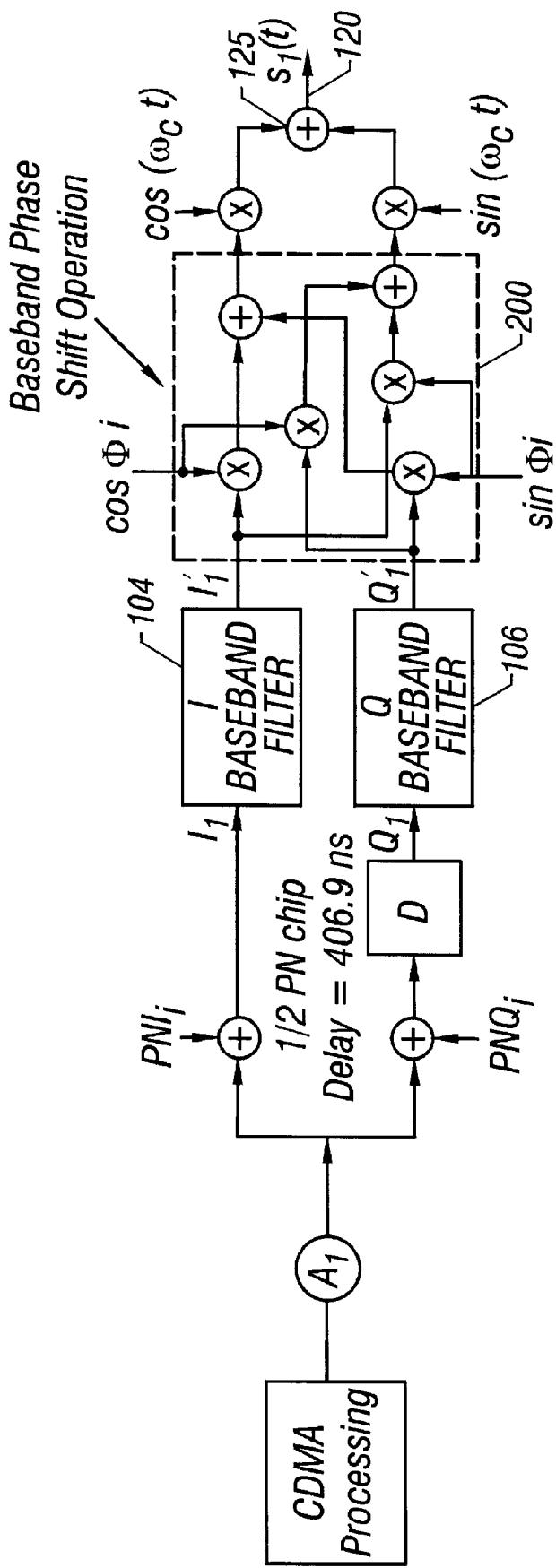
FIG. 2 shows a system of phase shifting at baseband.

FIG. 2 shows a basic system whereby the phase shifting is carried out in the baseband domain, prior to multiplication by the fundamental frequency. The baseband shifter 120 carries out multiplication according to the equation (1) which effectively carries out the phase shift in the analog domain.

Therefore, this system effectively calculates two baseband coefficients,

A=I'i cos$\phi_i$+Q'$_i$ sin$\phi_i$, and

B=Q'$_i$ cos$\phi_i$-I'$_i$ sin$\phi_i$.

The circuit of FIG. 2 includes a baseband phase shifter 200, which multiplies the I and Q components by multiples of the phase shift. The multiplication occurs at baseband.

An important feature of the embodiment of FIG. 2 is that no phase shifting at RF is required. All of the required mathematical operations, which here include only multiplications and additions can be easily performed in a DSP, which is used as part of the CDMA processing to output the coefficients A and B. Moreover, since the phase shift angles $\phi_i$ are constant, the values for the constants cos$\phi_i$ and sin$\phi_i$ can be stored in memory with the required precision to perform the above operations.

Figure 3:
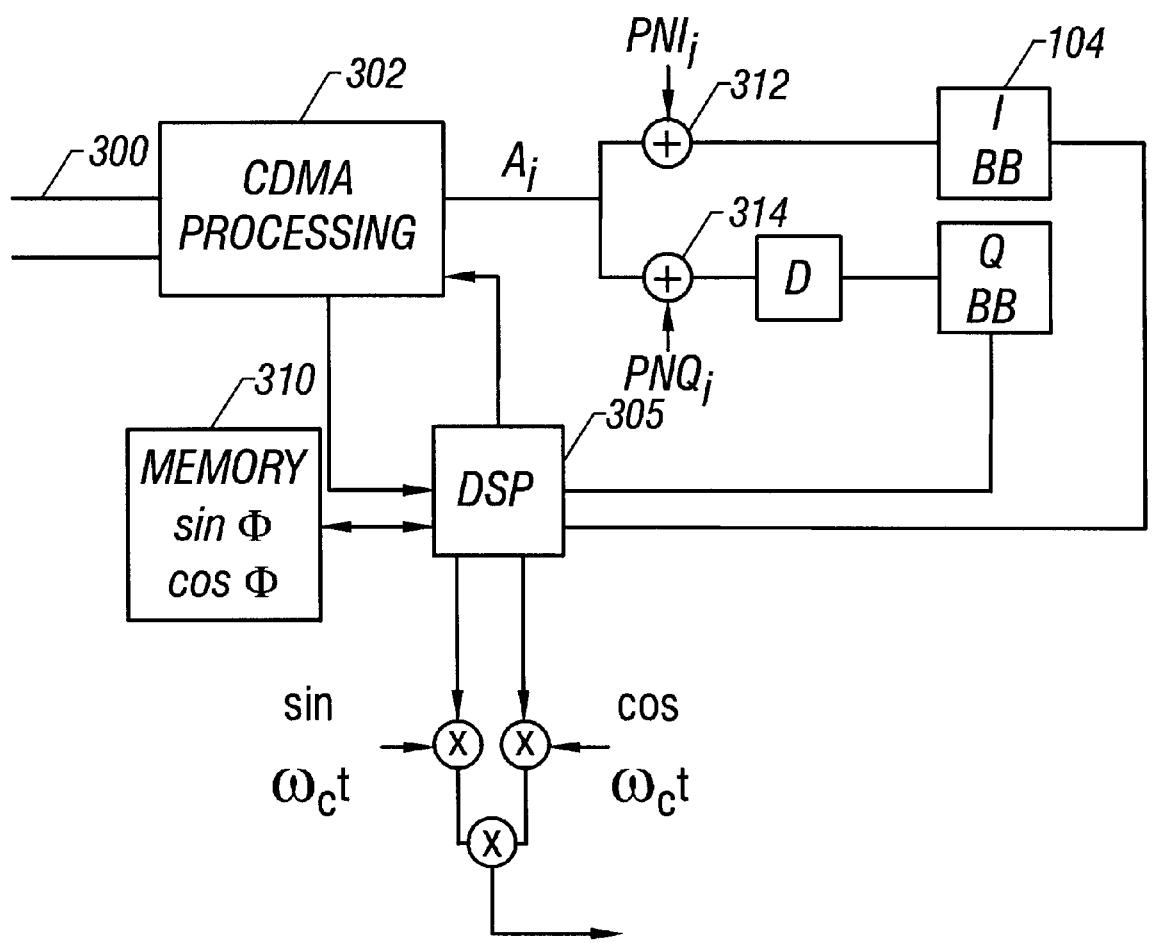
FIG. 3 shows a block diagram of the connection between the signal, the CDMA processing, and the DSP.

A block diagram of the circuit using a specialized processing device is shown in FIG. 3. The signal for transmission 300 is coded in the usual way in CDMA processing and encoding module 302. This module, for example, performs basic CDMA signal encoding. The way in which this coding is carried out is well known in the art, and described in many standards. As part of this coding, however, a specialized processing circuit, here a digital signal processor 305, is used. The coding operation also uses a working memory 310. The phase shift values are always sin or cos of the constant phase shifts $\phi$. Hence, the working memory 310 stores values of various constants, including sin$\phi_i$ and cos$\phi_i$ of the constant phase shift angles.

The output signal $A_r$ forms the input signal to the code channels such as 100. The code channels are divided into I and Q channels. The I and Q channels are appropriately multiplied by the I and Q channel sequence at 312 and 314 respectively. Those values are baseband filtered by the respective baseband filters 104, 106 to form the baseband-filtered signals I' and Q', respectively. The baseband-filtered signals I' and Q' are then fed back into the digital signal processor 305. DSP multiplies these signals by the constant sin$\phi$ and cos$\phi$ coefficients to obtain the values A and B as described above. These values A and B are multiplied by the fundamental frequency to form the RF output signals.

Figure 4:
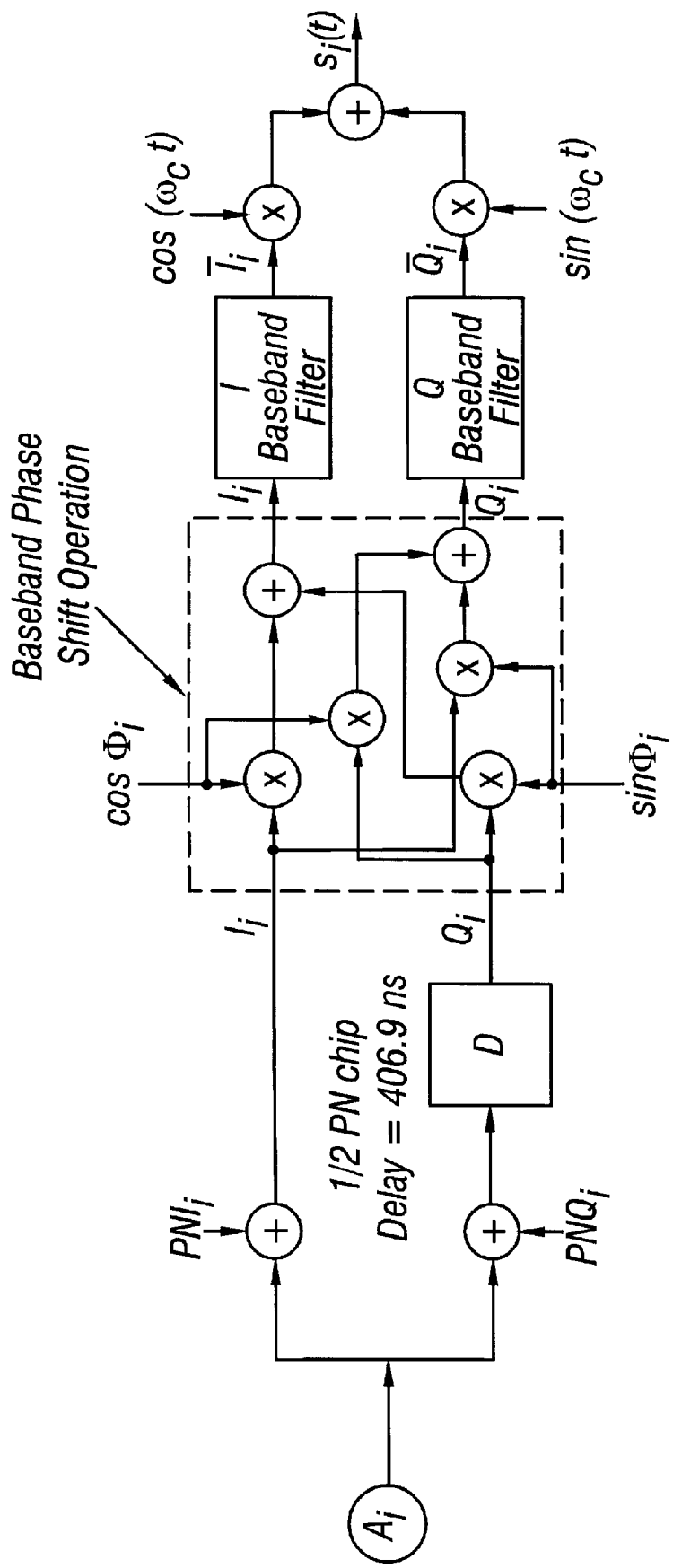
FIG. 4 shows an alternative embodiment of the baseband shifting operation.

A further simplification can be achieved by using a linear baseband filtering operation. This allows the phase shifting operation to be equivalently performed before baseband filtering as shown in FIG. 4. Note that the circuit of FIG. 4 can also be done as part of the CDMA processing block as shown in FIG. 3.

To see the merits of the above simplification, note that the composite transmit signal S(t) can be expressed as $$s(t) = \sum_{i=0}^{7} s_i(t) \qquad (2)$$

$$= \sum_{i=0}^{7} (\tilde{I}_i \cos\omega_c t + \tilde{Q}_i \sin\omega_c t)$$

$$= \cos\omega_c t \sum_{i=0}^{7} \tilde{I}_i + \sin\omega_c t \sum_{i=0}^{7} \tilde{Q}_i.$$

FIG. 4 shows that note that $\tilde{I}_l = L[\hat{I}_i]$ and $\tilde{Q}_l = L[\hat{Q}_l]$, where L [•] denotes the linear baseband filtering operation. Using these relationships in (2) and noting the fundamental property of a linear operation (i.e., L [x]+L [y]=L [x+y]), the composite TX signal can be expressed as $$s(t) = \cos\omega_c t L\left[\sum_{l=0}^{7} \tilde{I}_l\right] + \sin\omega_c t L\left[\sum_{i=0}^{7} \tilde{Q}_i\right]. \qquad (3)$$

Since this can be carried out as a summation of a number of coefficients, the inventor recognized that only a single baseband filter is required for each out of phase channel. Since there are two out of phase channel sequences I and Q, only two baseband filters are required. Summations of I and Q coefficients is carried out before the baseband filter.

Figure 5:
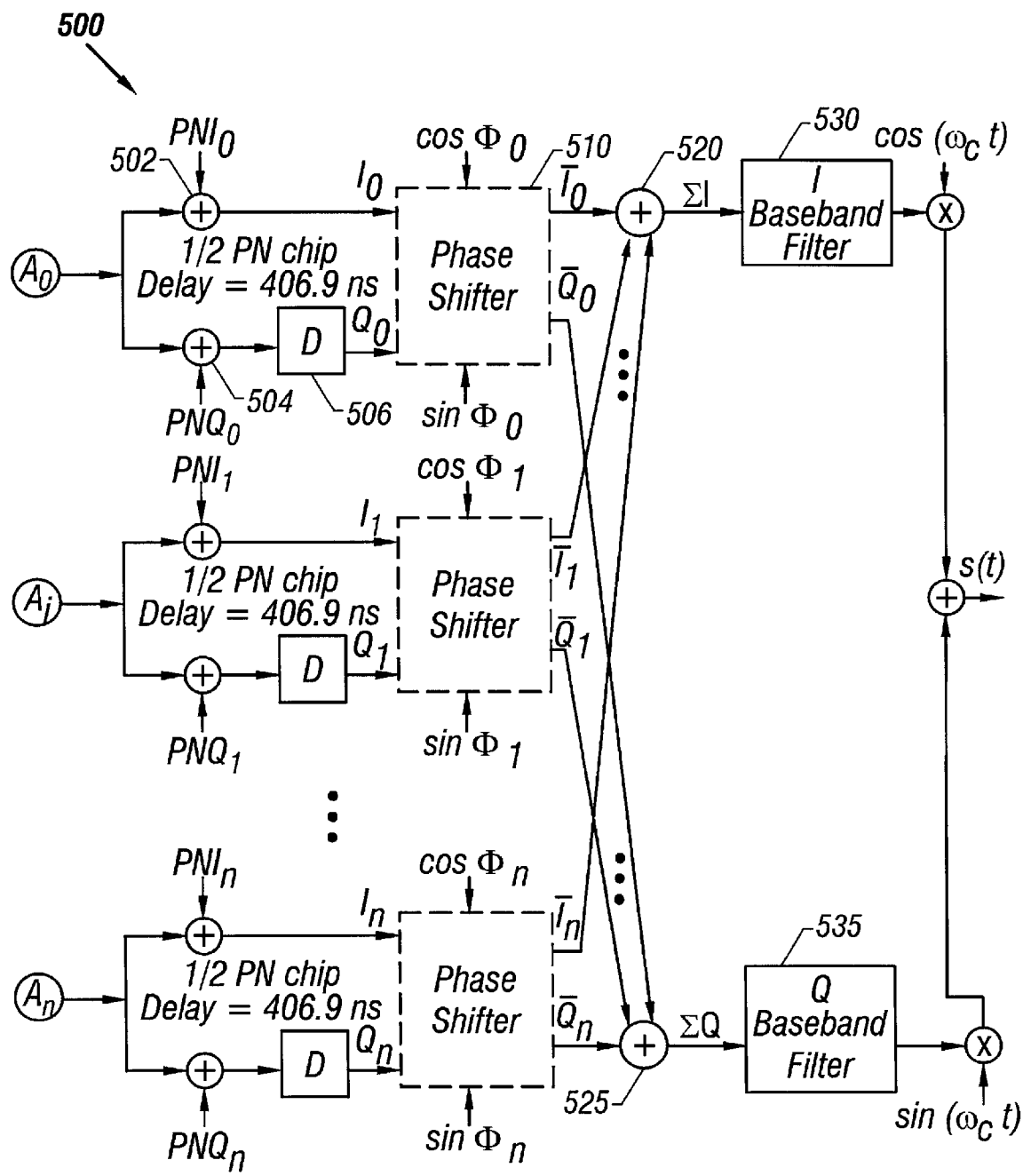
FIG. 5 shows yet another embodiment of phase shifting at baseband.

The circuit of FIG. 5 carries out this operation. Three channels are shown A0, A1 and $A_n$, where in the preferred embodiment n=7. Channel 500 includes a first portion which is substantially identical to the operation in the left portion of FIG. 4. Each of the I and Q channels includes the $PN_I$ and $PN_Q$ injectors 502, 504, a delay line 506, and a phase shifter element 510. The phase shifter element 510 can be that shown using combinations of multiplications, or can use a specialized processing device as shown in FIG. 3.

All of the $\hat{I}i$ outputs from the phase shifters are summed together in adder 520, and all of the $\hat{Q}_i$ outputs are summed together in adder 525. The resultant combined output of each adder corresponds to the summation of all $\hat{I}$ and $\hat{Q}$ channels. The $\hat{I}$ summation is baseband filtered by I baseband filter 350. The $\hat{Q}$ summation is baseband filtered by Q baseband filter 535. The resultant baseband outputs are then shifted to RF by multiplication by the sin and cos components $\omega_c$t.

This invention allows performing even more of the phase shifting operations at baseband. Only additions and multiplications are required. The constant values for cosines and sines of the phase shifts for the individual supplemental channels can be stored in memory.

All of these operations are ideally suited for implementation on a DSP or other specialized processing device.

Only two baseband filters are required. More generally, any number of channels can be summed together, accordingly reducing the number of baseband filters required.

Although only a few embodiments have been described above, other modifications are contemplated.

For example, any number of baseband filters could be used. Other forms of modulation, including conventional QPSK could be used. This is also applicable to other forms of wireless communication that use the principle of adding multiple code channels.

What is claimed is:

1. A code division multiple access communication system for processing a communication and transmitting said communication using an RF carrier, comprising:

a plurality of individual code channels, each code channel including part of said communication, said each code channel including an I code channel and a Q code channel, said Q code channel phase shifted relative to said I code channel, said part being processed separately from other parts of said communication, at least one of said plurality of individual code channels is transmitted with a phase shift relative to another code channel, where said at least one code channel includes:
  a phase shifting circuit operating to phase shift said signal relative to said another code channel, said phase shifting circuit operating at a baseband frequency to produce a phase shifted signal, and
  an RF modulator, modulating the phase shifted signal according to the RF carrier to produce a signal at said RF carrier that is phase shifted relative to said another code channel;
  an I component summing element summing components from at least a plurality of said I channels;
  a Q component summing element summing components from at least a plurality of said Q channel;
  an I baseband filter, collectively baseband-filtering said plurality of I channel components; and
  a Q baseband filter, collectively baseband-filtering said plurality of Q channel components.

2. A system as in claim 1 wherein said phase shifting circuit comprises only multipliers and adders.

3. A system as in claim 2 wherein said phase shifting circuit comprises a digital signal processor.

4. A circuit as in claim 1 wherein said phase shifting circuit comprises a specialized calculation circuit.

5. A system as in claim 1 further comprising a baseband filter associated with a plurality of said code channels.

6. A code division multiple access system, comprising:
  a plurality of code channels, each carrying portions of a complete communication, each code channel including an I component and a separate Q component, and at least one of said plurality of code channels including phase shifting elements which phase shift an output of an associated code channel relative to other code channels; and
  a plurality of summers, each summing together one of said components from multiple ones of said plurality of code channels, and
  a baseband filter associated with one of said summers, and substantially simultaneously baseband filtering said plurality of components from a plurality of said plural code channels.

7. A system as in claim 6 wherein said phase shifting elements comprise a plurality of multiplication elements and addition elements operating in the baseband domain.

8. A system as in claim 7 wherein said phase shifting elements comprise a specialized calculating element.

9. A method of communicating by CDMA, comprising:
  dividing a total communication into separated parts to be processed over separate but correlated channels, each channel including an I component and a separate Q component;
  applying a phase shift to at least one of said correlated channels by multiplying said at least one of said correlated channels by a value including a constant portion in a baseband domain;
  after said applying, shifting said correlated channels to an RF domain by multiplying said channels by a fundamental frequency;
  summing a plurality I components and a plurality of Q components from said correlated channels; and
  substantially simultaneously baseband filtering said plurality of I components and said plurality of Q components from said correlated channels.

* * * * *